Sept. 29, 1942.　　　G. F. RACKETT　　　2,297,582
COMPOSITE COLOR PHOTOGRAPHY
Filed May 1, 1940
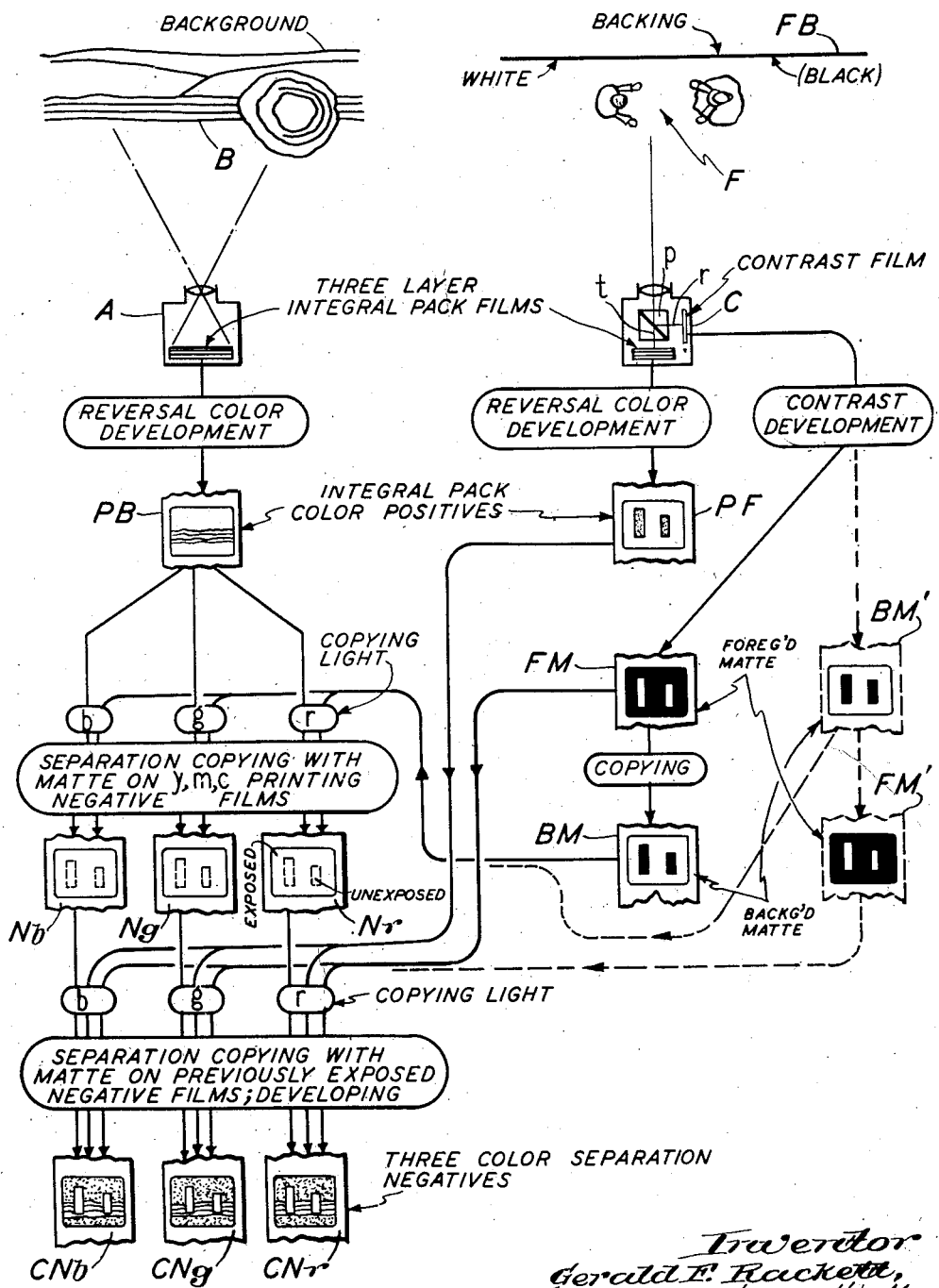

Patented Sept. 29, 1942

2,297,582

UNITED STATES PATENT OFFICE 2,297,582

COMPOSITE COLOR PHOTOGRAPHY

Gerald F. Rackett, Los Angeles, Calif., assignor to Technicolor Motion Picture Corporation, Los Angeles, Calif., a corporation of Maine Application May 1, 1940, Serial No. 332,747

3 Claims. (Cl. 88—16)

In motion picture production use is often made of so-called rear projection, for the purpose of economy as well as in order to provide effects which could otherwise not be obtained. As well known, rear projection utilizes positive records of background scenes with or without background action taken in nature or from miniature or full size studio set-ups, which positives are then projected from the rear on a screen in front of which foreground scenery is set up and foreground action is performed; the foreground scene and action and the picture projected on the screen are taken with a camera running in synchronism with the rear projector.

This rear projection technique, however, has various disadvantages especially for purposes of color photography. Such disadvantages are, for example, difficulty of providing on the background screen the necessary level of illumination, limitations in size of rear projection screens, loss of definition, desaturation of color, non-uniformity of the illumination level of the background field (hot spot) and disturbing grain or image mottle due to inherent characteristics of the screen.

In accordance with the present invention, these difficulties are overcome by directly combining background and foreground scenes without the intermediary of projecting the former on a screen in front of which the latter is performed; this direct record combination is accomplished with the aid of so-called mattes, that is, silhouette records with opaque portions covering the background or foreground portion respectively, of the picture area whereas the other portion is practically clear.

It has heretofore been proposed to combine various picture portions by means of such mattes; however, in the above-mentioned field of combining large background fields with full foreground scenes for purposes of color photography, these conventional methods yield only unsatsfactory results for example because of the considerable time they require for carrying out the various stages of laboratory processing before a producer can see whether or not a composite print is satisfactory, and because of difficulties in timing foreground and background action for proper coincidence of significant action.

It is one of the principal objects of the present invention to provide an improved process of making composite motion picture records with the aid of a matte which is especially suited for color photography (although it has certain features which may be advantageous in black and white cinematography), which simplifies the control of the necessary steps and considerably reduces their number and hence the time and cost required, without impairing in any respect the quality of the resulting final record.

In one of its aspects, the invention contemplates the use of integral pack film for recording the color aspect components of background and foreground fields; in another aspect, it involves the utilization of a procedure for obtaining extreme contrast silhouette prints, in connection with a peculiar illumination of the foreground scene, for obtaining mattes for purposes of color photography in a simple and yet satisfactory manner; in a further aspect it proposes the combined use of integral pack and matte records for making color separation records on separate supports, for purposes of conventional dye transfer printing; in still another aspect, the invention proposes the exposure of a matte record together with that of a pictorial record, which permits considerable reduction of the steps necessary for composite printing from separate foreground and background color aspect records.

These and other objects, aspects and features of the invention will be apparent from the following description of several practical embodiments which are representative of its genus; the description refers to a flow diagram of the various steps of the method according to the invention.

In this figure, B is a background of any desired type as a landscape, seascape or interior. A foreground field is indicated at F by two persons acting in front of a white backing FB. This backing is very strongly illuminated with white light to an intensity considerably above that to which the foreground is illuminated; the illumination of foreground and backing, respectively, is so regulated that the highlight detail of the former is recorded at the usual density, whereas the latter will be recorded above the maximum exposure level of the foreground. Background B and foreground F are illuminated with light of the spectral ranges usual in color motion picture work.

The background is photographed in a camera indicated at A on an integral pack film carrying joined on a single support at least two layers, strata or series of emulsion particles adapted to record different color aspects of an object field. Film of this kind is now well known and may be of the type carrying several differently sensitive layers which are after exposure simultaneously developed whereupon the positive records in sensitive emulsion, remaining after this initial development are step by step developed in subtractive dyes by means of color forming developers; or of the type incorporating in each layer a different colorless color former, respectively, which furnishes, after development of the silver negatives, with a suitable single developer positive records in different dyes of the appropriate subtractive color ranges; or of the type carrying several differently dyed layers which are under the control of negative silver records bleached to furnish positive records in the appropriate subtractive transmission ranges.

The positive background color record, a normal color record for example obtained by reversal color development, is in the figure indicated at PB.

The foreground scene F in front of backing FB is photographed by means of a multiple exposure camera C for example of the type described in Patent No. 2,072,091. Such cameras have a light divider $p$ which splits the image carrying beam into a directly transmitted and a reflected component beam, indicated at $t$ and $r$, respectively. In one aperture of this camera, preferably in the one receiving the directly transmitted light, an integral pack film of any desired type (some of which are above mentioned) is exposed, whereas the other aperture contains a film furnishing a silhouette record.

The pack film exposed in beam $t$ is treated according to one of the various processes now available for that purpose (some of which are mentioned above), for example reversal color development, furnishing an original positive record PF of the foreground with normal gradation but with the backing area substantially clear, having less density than any point of the actual foreground area.

The film exposed in beam $r$ is processed to furnish a maximum contrast or silhouette foreground matte FM with transparent foreground and practically opaque background portions, both without detail. The preparation of such a silhouette may take place in accordance with known intensification methods, although it is sometimes difficult especially if the difference of backing and maximum foreground illumination level, respectively, is slight; however it was found that the method described in copending application Serial No. 314,059 furnishes satisfactory results even under difficult conditions.

According to this method, the film in beam $r$ is sensitive to two light ranges (for example, a film according to Patent No. 1,804,727, of May 12, 1931, to Eastman A. Weaver) so that light composed of two ranges is differently absorbed by the emulsion. The latent record is developed and colored with a dye strongly absorbing the light used for copying with the silhouette record; in this manner it is possible to convert original records with density scales varying on either side of an intermediate density value, into silhouette copies effectively reproducing these two density scales as two extreme density values.

From matte FM a second matte BM is then printed which has opposite density values as compared to FM, namely is opaque over the foreground and clear over the backing area, respectively. If the first matte FM should not have adequate contrast properties, another print can be made from the second matte BM which print will then unquestionably have the required separation between foreground and backing areas.

The background and foreground color records PB and PF are then separated into three color separation records combining foreground and background scenes, as follows.

The background record PB is first separated into three latent color aspect records with unexposed foreground areas. A single layer film Nb is then exposed with blue light to positive record PB and matte BM in exact register. Any convenient printing technique can of course be employed for this purpose so long as it provides the required exact register.

In this manner, those portions of PB which cover the foreground scene will not be copied since the corresponding portions of the image carrying printing light beam are held back by the opaque portions of matte BM. As indicated at Nb, a partly exposed (over the background area) and partly unexposed (over the foreground area) film with the latent record of the blue aspect of the background is obtained in this manner. It will be understood that the blue copying light is bsorbed only by the yellow (minus blue) dye in which the blue aspect record of film PB is printed, whereas it is transmitted by the two other aspect records printed in magneta (minus green) and cyan (minus red).

This film is then, without being processed in any manner, exposed to positive foreground record PF in contact therewith, with blue light projected through foreground matte FM whose image is focused on record PF in exact register therewith. The background portions being opaque in matte FM, the clear backing portions of positive PF will be prevented from passing light onto film Nb.

Both background and foreground portions of film Nb have now received exposure in correct register; the film is then developed in the usual manner and represents a negative record CNb of the blue color aspect of the foreground scene F against the background B.

By exposing two other films in similar manner to the green and red color aspect records, respectively, of film PB, with green and red light absorbed by the magenta (minus green) and cyan (minus red) dye, respectively, in which these records are formed, two negatives CNg and CNr are printed representing green and red color aspect records, respectively.

It will be understood that the mattes FM and BM must be formed in a medium whose record portion passes neither of the light ranges used for printing therethrough and that the emulsion of films Nb, Ng, Nr must be sensitive at least to these ranges.

The color separation records CNb, CNg and CNr can then be used for manufacturing final color prints, for example by preparing therefrom gelatin relief matrix films for the purpose of printing a final positive film by way of dye transfer from these matrices on to a blank film; this process is well known and for example described in Patents No. 1,919,673 and No. 1,707,710.

Instead of illuminating a white backing with white light, an unilluminated black backing, for example of black velvet can be used as parenthetically indicated in the figure. In that instance, the foreground scene is illuminated at intensities providing on the film exposed in beam $r$ a background matte as indicated in dotted lines at BM', with a clear backing area and an opaque foreground area. The manner in which these mattes are during printing combined with records PB and PF is likewise indicated in dotted lines.

Although it was found that with the modification using a black backing, it is sometimes more difficult to maintain sufficient separation of the illumination levels of foreground and backing, it is generally speaking satisfactory if the light reflection values from all points of the backing are beyond an extreme value (maximum or minimum for white or black backing, respectively) of the reflection of similar light from the foreground field.

It will be understood that cameras of the type indicated at C of the drawing provide for exactly reproducible register between the records taken in the two apertures, and that exact register can be maintained through the entire process by means of appropriate copying apparatus.

It will also be understood that the two color separation printing steps are interchangeable; the foreground positive PF may first be printed together with the foreground matte FM and thereupon the background positive PB with the background matte BM.

It will be further understood that it is feasible to combine the background and foreground integral pack records PB and PF by printing them with the aid of a process different from the above-mentioned imbibition dye transfer process, for example, by photographic printing on an integral pack film. In the latter instance, the intermediary of three color separation records on individual supports may be unnecessary and the three layers of the final integral pack film will take the place of separation records $CNb$, $CNg$, $CNr$; the printing steps with combined matte and background or foreground record can then be performed by simultaneous reproduction of all three color aspects of background or foreground records, or by consecutive printing of the color aspects with suitably selected colored light.

It should be understood that the present disclosure is for the purpose of illustration only and that this invention includes all modifications and equivalents which fall within the scope of the appended claims.

I claim:

1. In the art of making composite photographic records of two object fields with mattes for masking selected picture portions during exposure, the method of producing pictures in natural colors which comprises illuminating a foreground field as well as a backing therebehind with light of similar nature containing all spectral ranges to be recorded, to degrees bringing the light reflection values from all points of the backing beyond an extreme value of the reflection of similar light from the foreground field, making color separation records joined on a single support of said foreground field against said backing, making color separation records of a background field, exposing simultaneously and in registerable relation with said joined foreground field records a matte record on a separate support of said foreground field against said backing, photographically preparing from said matte record a matte of maximum contrast between portions exposed with light of values on one side of said extreme from said foreground field and portions exposed with light of values on the other side of said extreme from said backing, and exposing said joined records through said matte.

2. In the art of making composite photographic records of two object fields with mattes for masking selected picture portions during exposure, the method of producing pictures in natural colors which comprises illuminating a foreground field and a backing therebehind with light of similar nature containing all spectral ranges to be recorded, to degrees bringing the light reflection values from all points of the backing beyond an extreme value of the reflection of similar light from the foreground field, making color separation records joined on a single support of said foreground field against said backing, making color separation records joined on a single support of a background field, exposing simultaneously and in registerable relation with said joined foreground field records a matte record on a separate support of said foreground field against said backing, photographically preparing from said matte record a matte of maximum contrast between portions exposed with light of values on one side of said extreme from said foreground field and portions exposed with light of values on the other side of said extreme from said backing, preparing from said matte a second maximum contrast matte with opposite density values, printing on photographic emulsion said joined records of said foreground field through the matte whose background area has maximum density, and printing on the same emulsion said joined records of said background field through the matte whose foreground area has maximum density.

3. In the art of making composite photographic records of two object fields with mattes for masking selected picture portions during exposure, the method of producing pictures in natural colors which comprises illuminating a foreground field and a backing therebehind with substantially white light to degrees bringing the light reflection values from all points of the backing above the maximum value of the reflection of similar light from the foreground field; exposing in one component beam of a light-dividing camera three latent color separation records joined on a single support of said foreground field against said backing; exposing in a second component beam of said camera in registerable relation to said latent records and simultaneously on a second support a fourth latent record of said foreground field against said backing; converting said joined latent foreground records into records in subtractive colors; making three color separation records, joined on a single support and in subtractive colors, of a background field; photographically preparing from said fourth latent record a matte with substantially clear portions exposed with light from said foreground field and substantially opaque portions exposed with light from said backing; making from said matte a second matte with substantially opaque foreground portions and substantially clear backing portions; separately printing on photographic emulsions on separate supports latent records from said joined background field records in register through said second matte and separately printing in register through said first matte on said separate latent records from said joined records of said foreground field.

GERALD F. RACKETT.